United States Patent
Yanagi

(10) Patent No.: US 8,651,649 B2
(45) Date of Patent: Feb. 18, 2014

(54) IMAGE FORMING METHOD AND INK SET

(75) Inventor: Terukazu Yanagi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 323 days.

(21) Appl. No.: 13/047,738

(22) Filed: Mar. 14, 2011

(65) Prior Publication Data

US 2011/0227994 A1      Sep. 22, 2011

(30) Foreign Application Priority Data

Mar. 17, 2010   (JP) ................................. 2010-061296

(51) Int. Cl.
    *B41J 2/01*        (2006.01)
(52) U.S. Cl.
    USPC ................. 347/96; 347/98; 347/100
(58) Field of Classification Search
    USPC ............ 347/95–100, 21, 28; 106/31.13, 31.6, 106/31.63; 523/160, 161
    See application file for complete search history.

(56) References Cited

U.S. PATENT DOCUMENTS

| 8,529,046 B2 * | 9/2013 | Sakai et al. ................... 347/100 |
| 2007/0076075 A1 * | 4/2007 | Schmid et al. ................ 347/102 |
| 2010/0003408 A1 * | 1/2010 | Yanagi et al. ................. 427/256 |
| 2010/0086692 A1 * | 4/2010 | Ohta ............................. 427/256 |

FOREIGN PATENT DOCUMENTS

| JP | 2003-103897 A |   | 4/2003 |
| JP | 2007277290 A | * | 10/2007 |
| JP | 2009-509822 A |   | 3/2009 |

* cited by examiner

*Primary Examiner* — Matthew Luu
*Assistant Examiner* — Rut Patel
(74) *Attorney, Agent, or Firm* — SOLARIS Intellectual Property Group, PLLC

(57) ABSTRACT

An image forming method including: applying a treatment liquid containing a copolymer of epihalohydrin and dimethylamine to a recording medium having a coated layer; and applying an ink composition containing a self-dispersing pigment, a solvent, a surfactant, wax particles and water to the recording medium.

11 Claims, No Drawings

IMAGE FORMING METHOD AND INK SET

CROSS-REFERENCE TO RELATED APPLICATION

This application is based on and claims priority under 35 USC 119 from Japanese Patent Application No. 2010-061296 filed on Mar. 17, 2010, the disclosure of which is incorporated herein by reference.

BACKGROUND OF THE INVENTION

1. Field of the Invention

The present invention relates to an image forming method and an ink set.

2. Description of the Related Art

An inkjet recording method is a method that forms images by applying small droplets of an ink composition (ink) to a recording medium, such as paper. The method is characterized by being able to print high-resolution and high-grade images with a relatively cheap apparatus at a high speed.

In recent years, with respect to the inkjet recording method, studies have been made regarding an inkjet recording method that uses two liquids, i.e., a fixing liquid and an ink composition, in which images are formed by bringing into contact the fixing liquid (treatment liquid) and the ink composition, from the viewpoints of, for example, improving color density and suppressing bleeding or variation.

For example, an image forming method is known that uses an aqueous recording liquid containing a pigment and an aromatic compound that has an acid group directly bonded to a ring and an aqueous fixing liquid containing a multivalent metal salt (refer to, for example, Japanese Patent Application Laid-Open (JP-A) No. 2003-103897). In addition, a method is disclosed that uses an ink and a fixing agent composition containing a cationic copolymer of a specific concentration of epihalohydrin and amine to obtain durable inkjet ink images (refer to, for example, Japanese National Phase Publication No. 2009-509822).

SUMMARY

However, the method described in Japanese National Phase Publication No. 2009-509822 exhibits an insufficient rubbing resistance of images when recording images on a paper into which an ink is not easily absorbed, such as a coat paper.

The present invention has been made in view of the above circumstances, and provides an image forming method.

Further, the present invention provides an ink set.

According to a first aspect of the present invention, an image forming method is provided, which includes applying a treatment liquid containing a copolymer of epihalohydrin and dimethylamine to a recording medium having a coated layer; and applying an ink composition containing a self-dispersing pigment, a solvent, a surfactant, wax particles and water to the recording medium.

According to a second aspect of the present invention, an ink set is provided, which includes a treatment liquid containing a copolymer of epihalohydrin and dimethylamine; and an ink composition containing a self-dispersing pigment, a solvent, a surfactant, wax particles and water.

DETAILED DESCRIPTION OF THE INVENTION

<Image Forming Method>

The image forming method according to the present invention includes applying a treatment liquid containing a copolymer of epihalohydrin and dimethylamine to a recording medium having a coated layer (treatment liquid-applying process), and applying an ink composition containing a self-dispersing pigment, a solvent, a surfactant, wax particles and water to the recording medium (ink-applying process).

According to the present invention, since a treatment liquid containing a copolymer of epihalohydrin and dimethylamine is used as a treatment liquid, and an ink composition containing a self-dispersing pigment, a solvent, a surfactant, wax particles, and water is used as an ink, when forming images by fixing the ink on a recording medium having a coated layer (for example, a coat paper) so as to form images, the ink composition may easily aggregate, and images with an excellent rubbing resistance can be formed.

Meanwhile, hereinafter, the ink composition may be simply referred to as "ink."

The treatment liquid has a main function of fixing on a recording medium the ink composition applied on the recording medium. With respect to the ink composition applied on the recording medium, it is considered that the liquid component of the ink composition is absorbed into the recording medium and droplets of the applied ink composition are dried, therefore the solid content, the main components of which is a pigment, is fixed on the recording medium. At this time, it is considered that, if a droplet of the ink composition applied on the recording medium enlarges on the recording medium, adjacent droplets may overlap, therefore bleeding may occur.

In the present invention, it is considered that since the ink composition contains wax, the enlargement of the droplets of the ink composition on the recording medium is suppressed so that the droplets existing on the recording medium may have a sufficiently small size.

If the ink droplets fixed on the recording medium in a state in which the enlargement of the ink droplets is suppressed and the ink droplets have a sufficiently small size are dried, an ink film formed on the recording medium has a larger film thickness than an ink film fixed on the recording medium in which the ink droplets have been enlarged. Therefore, it is considered that the present invention allows images formed on the recording medium to have a high image density and an excellent color tone.

It is considered that, if the droplets of the ink composition are fixed on the recording medium in a state in which the enlargement of the ink droplets is suppressed and the ink droplets have a sufficiently small size on the recording medium, the contact area of the ink film with the recording medium is smaller than that of an ink film fixed on the recording medium in which ink droplets have enlarged. In this case, it is considered that, generally, when images are formed by an ink film fixed on the recording medium in a state in which the enlargement of the ink droplets is suppressed and the ink droplets have a sufficiently small size on the recording medium, an ink film is easily peeled off by an external force, such as rubbing.

However, in the present invention, it is thought that since the ink composition contains wax, the wax acts as a lubricant in regard to an external force, therefore the external force is easily absorbed and turned aside. As a result, it is thought that images formed by the present invention have an ink film (image) which is not easily peeled off by an external force, such as rubbing, and thus have an excellent rubbing resistance.

Hereinafter, the recording medium, treatment liquid and ink composition used in the image forming method according to the present invention, and image forming method according to the present invention are described in detail.

[Recording Medium]

A recording medium having a coated layer is used as the recording medium.

The recording medium having a coated layer means a coated paper which is used in general offset printing and the like, and may be called as, for example, coat paper. Coated papers are prepared by providing coat layers through coating coat materials on surfaces of wood free papers, acid-free papers, or the like, the major component of which is cellulose.

Recording media having the area of 1,250 cm$^2$ or more indicates that the application amount of the ink applied at the time of image formation is relatively large, and in a case in which the area is 1,250 cm$^2$ or more, stacker blocking may easily occur.

In the recording medium according to the present invention, the coated layers are preferably in an amount of 12 g/m$^2$ or more in total of both sides, and more preferably 18 g/m$^2$ or more. Papers having coated layers in an amount of 12 g/m$^2$ or more in total of both sides are coated papers used for general offset printing and the like. When the amount of the coated layers is within the above range, a large amount of ink may be absorbed, and a large effect may be produced in the present invention.

Further, the basis weight of the recording medium is preferably from 70 g/m$^2$ to 350 g/m$^2$, and more preferably from 70 g/m$^2$ to 200 g/m$^2$. Papers used for general offset printing and the like have a basis weight within this range. In the case where the basis weight is within the above range, a large amount of ink may be absorbed, and a large effect may be produced in the present invention.

With regard to coated papers, ink absorption slowly proceeds in conventional image formation by general aqueous ink jetting. Particularly, in the case of forming an image at a high speed or on both sides of a recording medium, absorption and drying of ink proceed too slowly, and when plural sheets are stacked and accumulated, stacker blocking by which image transfers between the recording media may easily occur. However, in the image forming method of the present invention, the occurrence of stacker blocking may be prevented, and high-grade images with fine lines and fine image units being definite and uniform may be formed.

In the present invention, particularly, it is preferable to use a coated paper having a base paper and a coat layer including kaolin and/or calcium bicarbonate. More specifically, an art paper, a coat paper, a lightweight coat paper, or a very lightweight coated paper is more preferable.

The coated paper may be a commercially-available product, and examples thereof include general coated papers for printing. Specific examples include very light-weight coated papers such as OK EVER LIGHT COATED (trade name) manufactured by Oji Paper Co., Ltd. and AURORA S (trade name) manufactured by Nippon Paper Industries Co., Ltd.; lightweight coat papers (A3) such as OK KOTE (L) (trade name) manufactured by Oji Paper Co., Ltd. and AURORA L (trade name) manufactured by Nippon Paper Industries Co., Ltd.; coat papers (A2, B2) such as TOPKOTE PLUS (tradename) manufactured by Oji Paper Co., Ltd. and AURORA COAT (trade name) and U-LITE (trade name) manufactured by Nippon Paper Industries Co., Ltd.; and art papers (A1) such as 2/SIDE GOLDEN CASK GLOSS (trade name) manufactured by Oji Paper Co., Ltd. and TOKUBISHI ART (trade name) manufactured by Mitsubishi Paper Mills Ltd. Specific examples further include (N) SILVER DIA manufactured by Nippon Paper Industries Co., Ltd. and GASAI SHASHIN SHIAGE PRO (GASAI Photographic Quality Finishing PRO) manufactured by FUJIFILM Corporation.

Among them, a recording medium having a water absorption coefficient Ka of from 0.05 mL/m$^2$·ms$^{1/2}$ to 0.5 mL/m$^2$·ms$^{1/2}$ is preferable, a recording medium having a water absorption coefficient Ka of from 0.1 mL/m$^2$·ms$^{1/2}$ to 0.4 mL/m$^2$·ms$^{1/2}$ is more preferable, and a recording medium having a water absorption coefficient Ka of from 0.2 mL/m$^2$·ms$^{1/2}$ to 0.3 mL/m$^2$·ms$^{1/2}$ is still more preferable, from the viewpoints of obtaining large effects in suppression of colorant migration and obtaining a high-quality image having more favorable color density and hue than before.

The water absorption coefficient Ka has the same definition as that described in JAPAN TAPPPI Pulp and Paper Testing Method No. 51: 2000 (published by JAPAN TAPPI), the disclosure of which is incorporated by reference herein. Specifically, the water absorption coefficient Ka is calculated from a difference in water transfer amount between a contact time of 100 ms and a contact time of 900 ms that are measured using an automatic scanning liquid absorptometer KM500win (manufactured by KUMAGAI RIKI KOGYO CO., LTD.).

[Treatment Liquid]

As a treatment liquid, a treatment liquid containing a copolymer of epihalohydrin and dimethylamine is used.

The treatment liquid is constituted to be capable of forming an aggregation by coming into contact with the ink composition. Specifically, the treatment liquid preferably contains at least an aggregating agent that can aggregate dispersed particles, such as colorant particles (for example, pigments), dispersed in the ink composition, to form an aggregation. The treatment liquid may further include one or more additional components according to necessity. By using the treatment liquid together with the ink composition, it is possible to make inkjet recording faster and obtain images having an excellent image property (for example, reproducibility of fine lines or fine image portions) with a high density and resolution even in a high-speed recording in the case of forming images in an inkjet recording method.

(Copolymer of Epihalohydrin and Dimethylamine)

The copolymer of epihalohydrin and dimethylamine is not limited as long as it is a polymer obtained by copolymerizing epihalohydrin and dimethylamine.

Here, epihalohydrin, which is one of the copolymerization components of the copolymer of epihalohydrin and dimethylamine, is a compound represented by Formula (I) below.

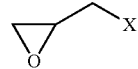

FORMULA (1)

In Formula 1, X represents a halogen atom.

Examples of the halogen atom can include a fluorine atom, a chlorine atom, a bromine atom, and an iodine atom, and epihalohydrin is called epichlorohydrin in a case in which X is a chlorine atom and epibromohydrin in a case in which X is a bromine atom.

Dimethylamine, which is the other copolymerization component of the copolymer of epihalohydrin and dimethylamine, is a secondary amine, and containing such a component makes it easy to obtain a linear copolymerized polymer.

By copolymerizing epihalohydrin and dimethylamine, it is possible to obtain a hydroxyl- and quaternary amine-containing polymer having a counter ion of halogen (X).

In the copolymer of epihalohydrin and dimethylamine, a secondary amine other than dimethylamine and/or a primary amine may be used as additional copolymerization component(s). In this case, a primary amine, such as monomethylamine, can add branches in the copolymerized polymer. Therefore, for example, by containing a primary amine in addition to epihalohydrin and dimethylamine, it is possible to promote linear copolymerization by a certain group of the copolymer and to introduce branches by the other group of the copolymer. In a case in which the copolymer contains both a primary amine and a secondary amine containing dimethylamine as the amine component, it is possible to obtain a mole ratio between the secondary amine and the primary amine (the secondary amine:the primary amine) in a range of about 100:1 to 10:1, whereby it is possible to provide branches in a desired ratio.

As the copolymer of epihalohydrin and dimethylamine, a commercially available product can be used, and, examples thereof include a copolymer of epichlorohydrin and dimethylamine (FLOQUAT FL-14, manufactured by SNF Floerger).

The content of the copolymers of epihalohydrin and dimethylamine in the treatment liquid is preferably from 0.5% by mass to 10% by mass, and more preferably 1% by mass to 5% by mass with respect to the total mass of the treatment liquid.

(Solvent)

The treatment liquid preferably contains a solvent.

As a solvent, a hydrophilic organic solvent is preferably used, and examples thereof include polyhydric alcohols, such as ethylene glycol, propylene glycol, diethylene glycol, polyethylene glycol, thiodiglycol, dithiodiglycol, 2-methyl-1,3-propanediol, 1,2,6-hexane triol, acetylene glycol derivatives, glycerin, and trimethylolpropane; lower alkyl ethers of polyhydric alcohol, such as ethylene glycol monomethyl (or ethyl)ether, diethylene glycol monomethyl (or ethyl)ether, and triethylene glycol monoethyl (or butyl)ether; heterocyclic rings, such as 2-pyrrolidone, N-methyl-2-pyrrolidone, 1,3-dimethyl-2-imidazolidinone, and N-ethylmorpholine; sulfur-containing compounds, such as sulfolane, dimethylsulfoxide, and 3-sulfolene; polyfunctional compounds, such as diacetone alcohol, and diethanolamine; and urea derivatives.

Among the above, polyhydric alcohol, such as glycerin or diethylene glycol, is preferable. In addition, these solvents may be used in one kind alone or used in two or more kinds in combination.

(Additional Components)

Examples of additional components that the treatment liquid may contain can include well-known additives, such as a solvent, an anti-drying agent (wetting agent), an anti-fading agent, an emulsion stabilizer, a penetration enhancer, an ultraviolet absorbent, a preservative agent, an antifungal agent, a pH adjuster, a surface tension adjuster, a defoamer, a viscosity modifier, a dispersant, a dispersion stabilizer, an anticorrosive agent, and a chelating agent.

The viscosity of the treatment liquid is preferably in the range of from 1 mPa·s to 30 mPa·s, more preferably from 1 mPa·s to 20 mPa·s, and still more preferably from 2 mPa·s to 15 mPa·s, and particularly preferably from 2 mPa·s to 10 mPa·s, from the viewpoint of the aggregation speed of the ink composition. Here, the viscosity is measured using a VISCOMETER TV-22 (tradename, manufactured by TOKI SANGYO CO. LTD) at 20° C.

The surface tension of the treatment liquid is preferably from 20 mN/m to 60 mN/m, more preferably from 20 mN/m to 45 mN/m, and still more preferably from 25 mN/m to 40 mN/m, from the viewpoint of the aggregation speed of the ink composition. Here, the surface tension is measured using an automatic surface tensiometer CBVP-Z (tradename, manufactured by Kyowa Interface Science Co., Ltd.) at 25° C.

[Ink Composition]

As the ink composition, an ink composition containing a self-dispersing pigment, a solvent, a surfactant, wax particles, and water is used. The ink composition may contain one or more additional components as long as it does not adversely affect the effects of the present invention.

(Self-Dispersing Pigment)

The self-dispersing pigment is a pigment formed by bonding many hydrophilic functional groups and/or salts thereof (hereinafter, referred to as a dispersibility-providing group) to the surface of a pigment directly or indirectly via an alkyl group, an alkylether group, an aryl group or the like, and is capable of being dispersed in an aqueous medium without a dispersant for dispersing a pigment. Here, the phrase "dispersible in an aqueous medium without a dispersant" means that dispersion in an aqueous medium can be achieved even when a dispersant for dispersing a pigment is not used.

In general, an ink that contains the self-dispersing pigment as a colorant is not required to contain a dispersant which is used for dispersing a pigment as described above, and, therefore, it is possible to easily prepare an ink in which foam formation due to the lowering of defoaming property caused by the dispersant scarcely occurs, and which is excellent in ejection stability. Examples of the dispersibility-providing group, which is bonded to the surface of the self-dispersing pigment, include —COOH, —CO, —OH, —$SO_3H$, —$PO_3H_2$ and quaternary ammonium, and salts thereof. The dispersibility-providing groups can be bonded by subjecting a pigment that is a raw material to a physical treatment or a chemical treatment, thereby bonding (grafting) the dispersibility-providing group or an active species having the dispersibility-providing group to the surface of the pigment. Examples of the physical treatment include a vacuum plasma treatment and the like. Examples of the chemical treatment include a wet oxidation method in which the pigment surface is oxidized with an oxidant in water, and a method in which p-aminobenzoic acid is bonded to the surface of a pigment, thereby bonding a carboxyl group via a phenyl group to the pigment.

In the invention, preferable examples of the self-dispersing pigment include self-dispersing pigments that are surface-treated by an oxidation treatment with hypohalous acid and/or a hypohalous acid salt, or an oxidation treatment with ozone. As the self-dispersing pigments, commercially available products may be used. Examples thereof include MICROJET CW-1 (trade name; manufactured by Orient Chemical Industries), and CAB-O-JET200 and CAB-O-JET300 (trade names; manufactured by CABOT Corporation).

—Pigment—

The pigment can be suitably selected depending on the purposes, and either of an organic pigment or an inorganic pigment may be used.

Examples of the organic pigment include an azo pigment, a polycyclic pigment, a dye chelate, a nitro pigment, a nitroso pigment, and aniline black. Among them, an azo pigment and a polycyclic pigment are preferable. Examples of the azo pigment include azo lake, an insoluble azo pigment, a condensed azo pigment, and a chelate azo pigment. Examples of the polycyclic pigment include a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinophthalone pigment. Examples of the dye chelate include a basic dye chelate and an acid dye chelate.

Further, examples of the inorganic pigment include titanium oxide, iron oxide, calcium carbonate, barium sulfate, aluminum hydroxide, barium yellow, cadmium red, chrome yellow, and carbon black. Among them, carbon black is particularly preferable. Note that, examples of the carbon black include those manufactured by a known method such as a contact method, a furnace method, or a thermal method.

The pigments may be used in one kind alone, or plural kinds of the pigments may be selected from each of the above groups or among the above groups and used in combination.

The content of the self-dispersing pigments in the ink composition is preferably from 1% by mass to 25% by mass, and more preferably from 2% by mass to 20% by mass, with respect to the total mass of the ink composition, from the viewpoints of color density, granularity, stability of the ink, and ejection reliability.

(Solvent)

The ink composition in the present invention contains water as a main solvent, but further contains at least one kind of solvent. The solvent may be either a hydrophobic organic solvent or a hydrophilic organic solvent, but a hydrophilic organic solvent is preferred. By containing a hydrophilic organic solvent, it is possible to seek, for example, prevention of drying, enhancement of penetration and adjustment of viscosity. In the case of using a hydrophilic organic solvent as an anti-drying agent, it is possible to effectively prevent nozzle clogging which may occur due to the drying of the ink at an ink ejection outlet when the ink composition is ejected by an inkjet method so as to record images.

To prevent the drying of the ink, a hydrophilic organic solvent with a lower vapor pressure than water is preferred. Specific examples of the hydrophilic organic solvent suitable for the prevention of drying can include polyhydric alcohols, such as ethylene glycol, propylene glycol, diethylene glycol, polyethylene glycol, thiodiglycol, dithiodiglycol, 2-methyl-1,3-propanediol, 1,2,6-hexane triol, acetylene glycol derivatives, glycerin, and trimethylolpropane; lower alkyl ethers of polyhydric alcohol, such as ethylene glycol monomethyl (or ethyl)ether, diethylene glycol monomethyl (or ethyl)ether, and triethylene glycol monoethyl (or butyl)ether; heterocyclic rings, such as 2-pyrrolidone, N-methyl-2-pyrrolidone, 1,3-dimethyl-2-imidazolidinone, and N-ethylmorpholine; sulfur-containing compounds, such as sulfolane, dimethylsulfoxide, and 3-sulfolene; polyfunctional compounds, such as diacetone alcohol, and diethanolamine; and urea derivatives.

Among the above, polyhydric alcohol, such as glycerin and diethylene glycol, is preferable.

These solvents may be used in one kind alone or used in two or more kinds in combination. A preferable content of these hydrophilic organic solvents in the ink composition is from 10% by mass to 50% by mass.

In addition, to enhance the penetration of the ink, a hydrophilic organic solvent is preferably used from the viewpoints of achieving the better penetration of the ink composition into a recording medium. Specific examples of the hydrophilic organic solvent suitable for the enhancement of penetration can include alcohols, such as ethanol, isopropanol, butanol, di(tri) ethylene glycol monobutyl ether, and 1,2-hexane diol. Including these solvents in the ink composition in a content of from 5% by mass to 30% by mass can yield a good effect. In addition, these hydrophilic organic solvents are preferably used in an amount added in such a range that the bleeding of printed characters and images and print-through do not occur.

In addition, the hydrophilic organic solvent can be used for viscosity adjustment other than the above. Specific examples of the hydrophilic organic solvent that can be used for viscosity adjustment include an alcohol (for example, methanol, ethanol, propanol, isopropanol, butanol, isobutanol, sec-butanol, t-butanol, pentanol, hexanol, cyclohexanol, benzyl alcohol), polyhydric alcohols (for example, ethylene glycol, diethylene glycol, triethylene glycol, tetraethylene glycol, polyethylene glycol, propylene glycol, dipropylene glycol, tripropylene glycol, polypropylene glycol, butylenes glycol, hexanediol, pentanediol, glycerin, hexanetriol, trimethylol propane, thiodiglycol), glycol derivatives (for example, ethylene glycol monomethyl ether, ethylene glycol monoethyl ether, ethylene glycol monbutyl ether, diethylene glycol monomethyl ether, diethylene glycol monobutyl ether, propylene glycol monomethyl ether, propylene glycol monbutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylendiamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone).

Meanwhile, the hydrophilic organic solvent may be used in one kind alone or two or more kinds in combination.

As the solvent, among the above, a polyhydric alcohol (polyhydric alcohol-based solvent) is preferred from the viewpoints of the stability of the ink.

(Surfactant)

Examples of the surfactant can include a nonionic surfactant, a cationic surfactant, an anionic surfactant, and a betaine surfactant.

Specific examples of the surfactant can also include surfactants described in Pages 37 to 38 of JP-A No. 59-157636 and Research Disclosure No. 308119 (1989). In addition, it is possible to improve rubbing resistance by using fluorine-based (alkyl fluoride-based) surfactants or silicon-based surfactants described in JP-A No. 2003-322926, JP-A No. 2004-325707, and JP-A No. 2004-309806. Furthermore, these surface tension adjusters can also be used as a defoamer, therefore it is possible to use a fluorine-based compound, a silicon-based compound, and a chelating agent represented by EDTA.

(Wax Particles)

The wax particles are included in the ink composition because they may suppress enlargement of droplets of the ink, and may improve the rubbing resistance of images after the ink droplets are solidified and thus fixed on a recording medium as an image.

Examples of waxes of the wax particles can include natural waxes and synthetic waxes.

Examples of the natural wax can include a petroleum-derived wax (a petroleum-based wax), a plant-derived wax (plant-based wax), and a plant and animal-derived wax.

Examples of the petroleum-derived wax can include a paraffin wax, a microcrystalline wax, and petrolatum; examples of the plant-derived wax can include a carnauba wax, a candelilla wax, a rice wax, and a Japan wax; and examples of the plant and animal-derived wax can include lanolin and beeswax.

Examples of a synthetic wax can include a synthetic hydrocarbon-based wax and modified waxes.

Examples of the synthetic hydrocarbon-based wax can include a polyethylene wax and a Fischer-Tropsch wax, and examples of the modified waxes can include a paraffin wax derivative, a montan wax derivative, and a microcrystalline wax derivative.

Among the above waxes, a paraffin wax contains hydrocarbons with a carbon number of from 20 to 40 as the main component, and is preferable from the viewpoints of its excellence in terms of image glossiness, prevention of water evaporation from a nozzle tip, and water retention effect.

In addition, a polyethylene wax is preferable from the standpoint of its excellent compatibility with a resin, whereby uniform and excellent images can be easily formed. Furthermore, a polyethylene wax can be easily modified, and a glycol-modified polyethylene wax, which is a modified polyethylene wax, can provide wettability arising from the glycol, whereby the wettability effect of the ink composition is exhibited at a nozzle tip, therefore a polyethylene wax is preferable due to its capability of achieving ejection stability more effectively.

In the present invention, it is preferable that, among the above waxes, the wax is at least one kind selected from a plant-derived wax and an oil-derived wax from the viewpoints of further improving the property to suppress enlargement of the droplets of the ink composition and further improving the rubbing resistance of images.

The melting point of the wax is preferably 40° C. or more, at which the stickiness of images, due to which, for example, recording media may stick together when recording media on which images are formed are stacked, can be suppressed (due to press blocking resistance), and is preferably less than 100° C. from the viewpoints of the ejection stability when the ink composition is used for inkjet recording. The melting point of the wax is more preferably from 45° C. to less than 100° C., and still more preferably from 50° C. to 95° C.

In the present invention, the wax is used in the form of wax particles and preferably added in the form of a dispersion (particularly, an emulsion). As a solvent of the dispersion, water is preferred, but the solvent of the dispersion is not limited thereto. For example, a general organic solvent can be suitably selected and used for dispersing. Examples of the solvent include ketones (acetone, methyl ethyl ketone, methyl isobutyl ketone, and cyclohexanone), alcohols (lower alcohol with a carbon number of from 1 to 8, for example, methyl alcohol, ethyl alcohol, isopropyl alcohol, butyl alcohol, hexyl alcohol, and octyl alcohol), glycol derivatives (cellosolve, ethylene glycol diethyl ether, and propylene glycol monomethyl ether), lower fatty acid ester with a carbon number of from 1 to 5 (ethyl acetate, butyl acetate, and ethyl propionate), haloalkanes (methylene dichloride, ethylene dichloride, trichloroethylene, trichloromethane, trichloroethane, and carbon tetrachloride), hydrocarbons (octane, solvent naphtha, turpentine, petroleum ether, thinner, petroleum benzine, benzene, toluene, and xylene), phenols (phenol and resorcinol), ethers (tetrahydrofuran and dioxane), phosphate esters (trimethylphosphate, triethylphosphate, and tributylphosphate), amide-based DMF, DMSO and the like. Preferable examples include alcohols, ketones, glycol derivatives, lower fatty acid esters, haloalkanes, and hydrocarbons. When a mixed solvent in which a solvent and water is mixed is used, preferable examples of the solvent include alcohols, ketones, and glycol derivatives, which may form a homogenous solvent when mixed with water. Preferable examples of solvents in the case of not using water include hydrocarbons, ketones, lower fatty acid esters, and haloalkanes.

A dispersion of the wax in the above solvents has an excellent stability. Here, the organic solvent may be used in combination with two or more kinds of solvents of similar or dissimilar kind.

The dispersion of the wax particles can be prepared by mixing the wax particles together with a known dispersant or emulsifying agent in the solvent. A ball mill may be used for the preparation of the wax dispersion.

From the viewpoints of the stability of the ink over time, the volume average particle diameter of the wax particles is preferably from 10 nm to 200 nm, more preferably from 50 nm to 100 nm, and still more preferably from 60 nm to 90 nm.

The volume average particle diameter of the wax particles can be measured by, for example, a particle size distribution measuring apparatus using light scattering, and, in the present invention, the volume average particle diameter is a value measured using a MICROTRAC UPA-EX 150 (trade name, manufactured by Nikkiso Co., Ltd.).

From the viewpoints of improving rubbing resistance, press blocking resistance, and ink ejectability (immediately after and after a certain period of time), the content of the wax is preferably from 0.1% by mass to 10% by mass (the concentration of wax solid content), and more preferably from 0.1% by mass to 5% by mass, with respect to the total mass of the ink composition.

(Water)

In the present invention, the ink composition preferably contains water. Moreover, the amount of water contained is not particularly limited. In the present invention, the content of water is preferably from 10% by mass to 99% by mass, and more preferably from 30% by mass to 80% by mass.

(Resin Particles)

The ink composition preferably contains resin particles.

As the resin particles, resin particles described in, for example, paragraph numbers from [0021] to [0055] of JP-A No. 2010-046896 can be used.

In the present invention, among the resin particles described in, for example, paragraph numbers from [0021] to [0055] of JP-A No. 2010-046896, from the viewpoints of ejection stability and liquid stability, self-dispersing polymer particles are preferable, and self-dispersing polymer particles having carboxyl groups are more preferable. Self-dispersing polymer particles refer to the particles of a water-insoluble polymer that can reach a dispersed state in an aqueous medium through the functional groups that the polymer itself has (particularly, acid groups or salt thereof) in the absence of a surfactant and where a separate emulsifying agent is not included.

The main chain skeleton of the water-insoluble polymer is not particularly limited, and, for example, a vinyl polymer and a condensation polymer (such as an epoxy resin, a polyester, a polyurethane, a polyamide, cellulose, a polyether, a polyurea, a polyimide, and a polycarbonate) can be used, and, among the above, a vinyl polymer is particularly preferable.

Examples of the vinyl polymer and monomers used in for forming the vinyl polymer can include those described in JP-A No. 2001-181549 and JP-A No. 2002-88294. In addition, a vinyl polymer having dissociative groups introduced at the ends of the polymer chains by the radical polymerization of vinyl monomers using a chain transfer agent, a polymerization initiator, or an iniferter, any of which has a dissociative group (or a substituent group that can derive dissociative group) or ion polymerization using a compound having a dissociative group (or a substituent groups that can derive dissociative group) on either an initiator or a stopping agent can also be used.

Preferable examples of the condensation polymer and monomers used for forming the condensation polymer can include those described in JP-A No. 2001-247787.

In the present invention, the self-dispersing polymer particles preferably include a water-insoluble polymer having a hydrophilic structural unit and a structural units derived from a monomer containing an aromatic group from the viewpoints of self-dispersibility.

The "structural unit (of a polymer) derived from a (specific) monomer" herein means a unit that has a structure which can be typically incorporated into the polymer by employing the (specific) monomer as that to be polymerized for forming the polymer.

The hydrophilic structural unit is not particularly limited as long as the hydrophilic structural unit derives from a hydrophilic-group-containing monomer (hydrophilic monomer). The hydrophilic structural units of the self-dispersing polymer may be derived from only one kind of hydrophilic-group-containing monomer or from two or more kinds of hydrophilic-group-containing monomers. The hydrophilic group is not particularly limited, and may be a dissociative group or a nonionic hydrophilic group.

In the present invention, the hydrophilic group of the hydrophilic structural units of the self-dispersing polymer is preferably a dissociative group, more preferably an anionic dissociative group, from the viewpoints of enhancing self-dispersibility and improving stability of the emulsified or dispersed state obtained. Examples of the anionic dissociative group include a carboxyl group, a phosphoric acid group, and a sulfonic acid group. A carboxyl group is particularly preferable from the viewpoint of the fixability of an ink composition.

The hydrophilic-group-containing monomer is preferably a dissociative-group-containing monomer, and more preferably a dissociative-group-containing monomer having a dissociative group and an ethylenically unsaturated bond, from the viewpoint of self-dispersibility.

Examples of the dissociative-group-containing monomer include an unsaturated carboxylic acid monomer, an unsaturated sulfonic acid monomer, and an unsaturated phosphoric acid monomer.

Examples of the unsaturated carboxylic acid monomer include acrylic acid, methacrylic acid, crotonic acid, itaconic acid, maleic acid, fumaric acid, citraconic acid, and 2-methacryloyloxyethylsuccinic acid.

Examples of the unsaturated sulfonic acid monomer include styrenesulfonic acid, 2-acrylamide-2-methylpropane sulfonic acid, 3-sulfopropyl (meth)acrylate, and bis-(3-sulfopropyl) itaconate.

Examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the above dissociative-group-containing monomers, unsaturated carboxylic acid monomers are preferable, and at least one of acrylic acid or methacrylic acid is more preferable, in consideration of dispersion stability and ejection stability.

The aromatic group-containing monomer is not particularly limited as long as it is a compound containing aromatic groups and polymerizable groups. The aromatic group may be a group derived from an aromatic hydrocarbon or a group derived from an aromatic heterocyclic ring. In the present invention, from the viewpoints of the particle shape stability in an aqueous medium, a group derived from an aromatic hydrocarbon is preferable.

In addition, the polymerizable group may be a polymerizable group of condensation polymerizable or a polymerizable group of addition polymerizable. In the present invention, from the viewpoints of the particle shape stability in an aqueous medium, a polymerizable group of addition polymerizable is preferable, and a group having an ethylenically unsaturated bond is more preferable.

The aromatic group-containing monomer in the present invention is preferably a monomer having an aromatic group derived from an aromatic hydrocarbon and an ethylenically unsaturated bond. The aromatic group-containing monomer may be used in one kind alone or in a combination of two or more kinds.

From the viewpoints of the balance between the hydrophobic property and hydrophilic property of the polymer chain and ink fixability, preferable examples of the aromatic group-containing monomer include an aromatic group-containing (meth)acrylate monomer, more preferable examples include phenoxyethyl (meth)acrylate, benzyl (meth)acrylate, and phenyl (meth)acryalate, and still more preferable examples include phenoxyethyl (meth)acrylate and benzyl (meth)acrylate.

Meanwhile, "(meth)acrylate" refers to acrylate or methacrylate.

From the viewpoints of self-dispersibility and the aggregation speed of the ink when the ink and the treatment liquid are brought into contact to form images, the self-dispersing polymer particles preferably contains a polymer having a carboxyl group, and the polymer preferably has a carboxyl group and has an acid value of from 25 mgKOH/g to 150 mgKOH/g. The acid value is more preferably from 50 mg KOH/g to 100 mg KOH/g. If the acid value is too low, the dispersion stability of the resin may lowers and the stability of the ink may degrade. In addition, if the acid value is too high, the viscosity of the ink may increase, and an adverse effect, such as degradation of ejectability, may occur.

The self-dispersing polymer particles are preferably the particles of an acrylate-based polymer, and preferably contain a structural unit derived from an aromatic group-containing (meth)acrylate monomer, the content of which is preferably from 10% by mass to 95% by mass. A content of the aromatic group-containing (meth)acrylate monomer in a range of from 10% by mass to 95% by mass can improve the stability of a self-emulsified or dispersed state and, furthermore, may suppress an increase of the ink viscosity.

In the present invention, from the viewpoints of the stability of a self-dispersed state, the stability of particle shapes in an aqueous medium due to the hydrophobic interaction among aromatic rings, and a decrease in the amount of water-soluble components due to an adequate degree of hydrophobization of the particles, the content of the aromatic group-containing (meth)acrylate monomer is more preferably from 15% by mass to 90% by mass, more preferably from 15% by mass to 80% by mass, and particularly preferably from 25% by mass to 70% by mass.

In the present invention, the self-dispersing polymer particles can include, for example, a structural unit derived from an aromatic group-containing monomer and a structural unit derived from a dissociative group-containing monomer. Furthermore, according to necessity, the self-dispersing polymer particles may also include additional structural unit(s).

A monomer that forms the above additional structural unit is not particularly limited as long as it is a monomer that can be copolymerized with the aromatic group-containing monomers and the dissociative group-containing monomers. Among them, an alkyl group-containing monomer is preferred from the viewpoints of the flexibility of the polymer skeleton and easy control of the glass transition temperature (Tg).

—Molecular Weight of Resin Particles—

The range of molecular weight of the resin is, by weight average molecular weight, preferably from 1,000 to 200,000, more preferably from 1,000 to 100,000, and still more preferably from 1,000 to 10,000. A weight-average molecular weight of 1,000 or more can ensure ejection stability.

Meanwhile, the weight-average molecular weight can be measured by gel permeation chromatography (GPC). In the present invention, in the GPC, three columns of TSKgel GMHxL, TSKgel G4000HxL, and TSKgel G2000HxL (trade name, manufactured by Tosoh Corp., 4.6 mm ID×15 cm) and THF (tetrahydrofuran) as an eluting solution are used. The conditions are as follows: sample concentration of 0.35% by mass, a flow rate of 0.35 mL/min, an amount of the sample injected of 10 μL, and a measurement temperature of 40° C. An RI detector is used. Furthermore, the standard curves are made from 8 samples of "standard sample TSK standard, polystyrene": "F-40", "F-20", "F-4", "F-1", "A-5000", "A-2500", "A-1000", and "n-propylbenzene" (all trade names, manufactured by Tosoh Corp.).

The resin particles (particularly, self-dispersing polymer particles) may be used in one kind alone or in a mixture of two or more kinds.

From the viewpoints of uniform image shininess, the content of the resin particles (particularly, self-dispersing polymer particles) in the ink composition is preferably from 1% by mass to 10% by mass, and more preferably from 2% by mass to 5% by mass, with respect to the total mass of the ink composition.

(Additional Components)

Examples of the additional components that can be contained in the ink composition can include known additives, such as an anti-fading agent, an emulsion stabilizer, a penetration enhancer, an ultraviolet absorbent, a preservative agent, an antifungal agent, a pH adjuster, a defoamer, a viscosity modifier, a dispersant, a dispersion stabilizer, an anti-corrosive agent, and a chelating agent. A variety of these additives may be added directly after preparation of the ink composition or added during preparation of the ink composition. Specific examples thereof can include other additives described in paragraph numbers from [0153] to [0162] of JP-A No. 2007-100071.

From the viewpoints of the droplet ejection stability and aggregation speed of the ink composition in the case of applying an ink in an inkjet method, the viscosity of the ink composition according to the present invention is preferably from 4.5 mPa·s to 6.5 mPa·s, and more preferably from 5 mPa·s to 6 mPa·s.

In addition, in the case of applying the ink composition by a method other than the inkjet method, the viscosity is preferably in a range of from 1 mPa·s to 40 mPa·s, and more preferably in a range of from 5 mPa·s to 20 mPa·s.

As the viscosity of the ink composition a value measured at 25° C. using an E-type viscometer (manufactured by Toki Sangyo Co., Ltd.) is employed.

The surface tension of the ink composition is, to satisfactorily eject droplets in an inkjet method, preferably from 20 mN/m to 60 mN/m, more preferably from 20 mN/m to 45 mN/m, and still more preferably from 25 mN/m to 40 mN/m. On the other hand, in the case of applying the ink by a method other than the inkjet method, the surface tension of the ink composition is preferably from 20 mN/m to 60 mN/m, and more preferably from 30 mN/m to 50 mN/m.

In the present invention, the surface tension of the ink composition is measured using a plate method at 25° C.

[Image Forming Method]

The image forming method according to the present invention includes applying a treatment liquid containing a copolymer of epihalohydrin and dimethylamine to a recording medium having a coated layer (treatment liquid-applying process), and applying an ink composition containing a self-dispersing pigment, a solvent, a surfactant, wax particles and water to the recording medium (ink-applying process).

In addition, the image forming method according to the present invention may include one or more additional processes according to necessity.

Hereinafter, each process of the image forming method according to the present invention are described.

—Treatment Liquid-Applying Process—

The treatment liquid-applying process refers to a process in which the above-described treatment liquid containing the copolymer of epihalohydrin and dimethylamine, which is a component that aggregates the components in the ink composition, is applied on a recording medium having a coated layer.

That is, the treatment liquid that can form an aggregation is applied on a recording medium and is brought into contact with the ink composition so as to produce images. In this case, dispersed particles, such as the resin particles or self-dispersing pigments, in the ink composition are aggregated and images are fixed on a recording medium.

Application of the treatment liquid on a recording medium can be conducted using a known method, such as a coating method, an inkjet method, and a dipping method. Examples of the coating method can include known coating methods using any of an extrusion die coater, an air doctor coater, a blade coater, a rod coater, a knife coater, a squeeze coater, a reverse roll coater, and a bar coater.

The treatment liquid-applying process may be provided either before or after the ink-applying process using the ink composition.

In the present invention, it is preferable to provide the ink-applying process after the treatment liquid-applying process in which the treatment liquid is applied. That is, it is preferable to previously apply the treatment liquid, which aggregates the colorants (preferably pigments) in the ink composition, before the ink composition is applied on a recording medium, and then to apply the ink composition so as to be brought into contact with the treatment liquid which has been applied on the recording medium, thereby; producing images. Accordingly, inkjet recording can be performed faster, and images with a high density and resolution can be obtained even in a high-speed recording.

The amount of the treatment liquid applied is not particularly limited as long as it can aggregate the ink composition, but, preferably, the amount of the treatment liquid may be such an amount that an amount of an applied aggregating agent (for example, di- or higher valent carboxylic acid or a cationic organic compound) is from 0.1 $g/m^2$ or more. Among the above, the amount of an aggregating agent applied is preferably from 0.1 $g/m^2$ to 1.0 $g/m^2$, and more preferably from 0.2 $g/m^2$ to 0.8 $g/m^2$. If the amount of the aggregating agent applied is 0.1 $g/m^2$ or more, an aggregation reaction proceeds further satisfactorily, and if the amount of the aggregating agent applied is 1.0 $g/m^2$ or less, the degree of glossiness does not become too high, which is preferable.

In addition, in the present invention, it is also preferable to provide the ink-applying process after the treatment liquid-applying process and further provide, during a time span of from the application of the treatment liquid on a recording medium to the application of the ink composition, a heating and drying process in which the treatment liquid on a recording medium is heated and dried. By previously heating and drying the treatment liquid before the ink-applying process, ink coloring properties, such as bleeding prevention, may be improved, and visible images with a more favorable color density and hue can be recorded.

The heating and drying can be conducted by a known heating means, such as a heater, or an air-blowing means using air-blowing by, for example, a drier, or a combined means thereof. Examples of heating methods can include a method that provides heat by, for example, a heater from the opposite surface of the treatment liquid-applied surface of a recording medium, a method that directs a warm air or a hot air to the treatment liquid-applied surface of a recording medium, and a heating method that uses an ultraviolet heater, and heating may be conducted by combining plural methods thereof.

—Ink-Applying Process—

The ink-applying process refers to a process in which the above-mentioned ink composition is applied on a recording medium.

Application of the ink composition on a recording medium, similarly to the application of the treatment liquid, can be conducted using the above-mentioned known method, such as a coating method, an inkjet method, and a dipping method. The above-mentioned ink composition used in the present invention is a liquid-phase composition with a low viscosity using water as a solvent, and thus has a good ejectability from a fine pore, such as a nozzle, therefore an inkjet method is preferred. That is, the image forming method according to the present invention is preferably an inkjet recording method.

In an inkjet method, the ink composition may be applied in a single path method. The single pass method is described below.

In the present process, it is possible to selectively apply the ink composition on a recording medium and form desired visible images.

Image formation by the inkjet method can be conducted by, specifically, providing energy so as to eject the treatment liquid on a desired recording medium, that is, a common paper, a resin coat paper, an inkjet-exclusive paper described in, for example, JP-A No. 8-169172, JP-A No. 8-27693, JP-A No. 2-276670, JP-A No. 7-276789, JP-A No. 9-323475, JP-A No. 62-238783, JP-A No. 10-153989, JP-A No. 10-217473, JP-A No. 10-235995, JP-A No. 10-337947, JP-A No. 10-217597, and JP-A No. 10-337947, a film, an electrophotographic paper, a fabric, glass, a metal, and a ceramic pottery. Meanwhile, a preferable image forming method of the present invention can include a method described in paragraph numbers [0093] to [0105] of JP-A No. 2003-306623.

The inkjet method is not particularly limited, and may be conducted by any of known methods, such as a charge-controlling method that ejects an ink using an electrostatic induction force, a drop-on-demand method (pressure pulse method) that uses oscillating pressure of a piezo element, an acoustic inkjet method that ejects an ink by using radiation pressure obtained by converting electrical signals to acoustic beams and irradiating the beams to an ink, and a thermal inkjet (BUBBLE JET (registered trade mark) method that heats an ink so as to form air bubbles and uses the generated pressure.

Further, the above inkjet method includes a method that ejects an ink with a low density, which is called a photo ink, multiple times in a low volume, a method that improves images using plural inks with substantially similar hues and different densities, and a method that uses a colorless and transparent ink.

An inkjet head used in the inkjet method may be an on-demand mode or a continuous mode. In addition, specific examples of ejecting methods can include an electromechanical conversion method (for example, single cavity type, double cavity type, vendor type, piston type, share mode type, and shared wall type), an electrothermal conversion method (for example, thermal inkjet type and BUBBLE JET (registered trade mark) type), an electrostatic attraction method (for example, electric-field control type and slit jet type) and an electrical discharge method (for example, spark jet type), but any ejecting method can be used.

Further, for example, an ink nozzle used when conducting recording by the inkjet method is not particularly limited, and can be appropriately selected according to purpose.

Examples of the inkjet head include an inkjet head of a shuttle mode that uses a short serial head and conducts recording by scanning the head in the width direction of a recording medium, and an inkjet head of a line (single path) mode that uses a line (single path) head in which recording elements are disposed correspondingly across one side of a recording medium.

In the image forming method according to the present invention, the ink composition may be applied on a recording medium using this single path head in the single path mode.

The line mode can record an image on the entire surface of a recording medium by scanning the recording medium in a direction perpendicular to the disposal direction of recording elements, and therefore a transporting system, such as a carriage that scans the short head, is not required. In addition, since complicated scanning control of carriage movement and a recording medium is not required and only the recording medium moves, compared with the shuttle mode, a faster recording speed can be achieved.

The image forming method according to the present invention can suppress the occurrence of press blocking by using the ink composition of the present invention, and can seek an improvement of ejection accuracy by ejecting the ink composition in the single path mode, and can significantly suppress corrosion due to the contact between a nozzle plate and an ink.

Furthermore, when the line mode is used in the ink-applying process, one kind of ink composition may be used the ink-applying process or two or more kinds of ink compositions may be used in the ink-applying process. When two or more kinds of ink compositions are used, a droplet ejection interval between a firstly-ejected ink composition (the $n^{th}$ color ($n \geq 1$), for example the second color) and a subsequently-ejected ink composition (the $(n+1)^{th}$ color, for example the third color) may be set to 1 second or shorter, whereby recording can be preferably conducted. In the present invention, by setting the ejection interval to one second or shorter in the line mode, it is possible to prevent bleeding or color mixing caused by the interference between ink droplets and obtain images with an excellent rubbing resistance and in which the occurrence of blocking is suppressed when recording as fast as or faster than before. In addition, it is also possible to obtain images with an excellent hue and image printing property (reproducibility of fine lines or fine image units in an image).

From the viewpoints of obtaining highly defined images, the amount of ink droplets ejected from an inkjet head is preferably from 0.5 pL to 6 pL (picoliter), more preferably from 1 pL to 5 pL, and still more preferably from 2 pL to 4 pL.

—Heating and Fixing Process—

It is also preferable that the image forming method according to the present invention includes, after the ink-applying process, a heating and fixing process in which a heated surface is brought into contact with an ink image formed by provision of the ink composition so as to heat and fix the ink image. By conducting a heating and fixing treatment, an image on a recording medium is fixed, therefore the resistance of the image against rubbing can be further improved.

It is preferable that the heating is conducted at a temperature equal to or higher than the minimum filming temperature (MFT) of the polymer particles in the image. By heating at a temperature equal to or higher than MFT, the polymer particles are coated, whereby the image becomes strengthened. The heating temperature is preferably in a temperature range equal to or higher than MFT. Specifically, the heating temperature is preferably in a range of from 40° C. to 80° C., more preferably from 50° C. to 75° C., and still more preferably from 55° C. to 70° C.

The MFT of the polymer particles is controlled depending on the Tg of the polymer and the kind and amount of an ink solvent, and, in general, as the Tg lowers, the I/O value of the ink solvent lowers, and the amount of the ink solvent increases, the MFT tends to lower.

The pressure, when pressurization is conducted together with heating, is preferably in a range of 0.1 MPa to 3.0 MPa, more preferably from 0.1 MPa to 1.0 MPa, and still more preferably from 0.1 MPa to 0.5 MPa, from the standpoint of surface smoothing.

The heating method is not particularly limited, but preferable examples of the heating method can include a method in which an image is dried without contact, such as a method in which an image is heated by a heating element, such as a nichrome wire heater, a method in which warm air or hot air is supplied, and a method in which heating is conducted using, for example, a halogen lamp and an infrared lamp. In addition, the heating and pressurization method is not particularly limited, but preferable examples can include a method in which heating and fixing are conducted through contact, such as a method that presses a hot plate on an image-forming surface of a recording medium, or a method in which a recording medium passes through a pair of rollers, using a pair of heating and pressurizing rollers, a pair of heating and pressurizing belts, or a heating and pressurizing apparatus having a heating and pressurizing belt disposed on the image-recording surface side of a recording medium and a retention roller disposed at the opposite side thereof.

In the case of heating and pressurizing, the nip time is preferably from 1 millisecond to 10 seconds, more preferably from 2 milliseconds to 1 second, and still more preferably from 4 milliseconds to 100 milliseconds. In addition, the nip width is preferably from 0.1 mm to 100 mm, more preferably from 0.5 mm to 50 mm, and still more preferably from 1 mm to 10 mm.

The heating and pressurizing roller may be a metal-made metal roller or a metal-made cored bar having a coated layer made of an elastic body and, according to necessity, a surface layer (also called a release layer), all of which are provided around the cored bar. The latter cored bar can be constituted with a cylindrical body made of, for example, iron, aluminum, or SUS, and the surface of the cored bar is a coated layer, at least a part of which is preferably coated. The coated layer is preferably made of, particularly, a silicone resin or a fluorine resin having release property. In addition, it is preferable that a heating element be built in one of the cored bars of the heating and pressurizing rollers, and a heating treatment and a pressurizing treatment may be conducted at the same time by passing a recording medium between the rollers, or, according to necessity, heating may be conducted with a recording medium interposed between two heating rollers. Preferable examples of the heating element can include a halogen lamp heater, a ceramic heater, and a nichrome wire.

A preferable example of belt substrates constituting a heating and pressurizing belt used in a heating and pressurizing apparatus is a seamless nickel electric brass, and the thickness of the substrate is preferably from 10 μm to 100 μm. In addition, as a material for the belt substrate, a material other than nickel, such as aluminum, iron, or polyethylene, can be used. In the case of using a silicone resin or a fluorine resin, the thickness of a layer formed using them is preferably from 1 μm to 50 μm, and more preferably from 10 μm to 30 μm.

Furthermore, to achieve the pressure (nip pressure), it is preferable to select and install an elastic member, such as a spring having a tensile force, at both ends of the roller, for example, the heating and pressurizing roller, in consideration of the nip interval so that a desired nip pressure is obtained.

In the case of using the heating and pressurizing roller or the heating and pressurizing belt, the conveying speed of a recording medium is preferably in a range of from 200 mm/second to 700 mm/second, more preferably from 300 mm/second to 650 mm/second, and still more preferably from 400 mm/second to 600 mm/second.

In an embodiment of the image forming method according to the present invention, the method preferably includes a removing process in which ink attached to an inkjet head conducting ejection in the single path method is removed.

Conducting the removing process, that is, removing the ink composition, an attachment derived from the ink composition, or another attachment attached to the inkjet head is removed, and thus it is preferable to include this process from the standpoint of further improving ink ejectability immediately after ejection or after aging.

<Ink Set>

The ink set of the present invention includes a treatment liquid containing a copolymer of epihalohydrin and dimethylamine, and an ink composition containing a self-dispersing pigment, a solvent, a surfactant, wax particles and water.

The ink set of the present invention is not particularly limited as long as it includes the treatment liquid and the ink composition of the present invention containing a self-dispersing pigment, a solvent, a surfactant, wax particles and water, and may include one or more additional ink compositions according to necessity.

As the examples of the additional ink compositions, a well-known ink can be used.

EXAMPLES

Hereinafter, the present invention is described in more detail with examples. The scope of the present invention is not limited to the examples below. Further, unless otherwise described, "parts" and "%" are mass-based.

<Preparation of the Ink Composition>

—Ink C1—

Components were mixed and dissolved to produce the composition below, whereby the ink C1 was prepared.

| | |
|---|---|
| Self-dispersing pigment [a self-dispersing cyan pigment, CAB-O-JET250, trade name, manufactured by Cabot Corporation] | 2.5% |
| Solvent | |
| Tripropylene glycol | 17% |
| Tetraethylene glycol | 4% |
| Water | 73.4% |
| Surfactant | |
| Phosphate ester surfactant | 0.5% |
| Zonyl - FSN 100 [trade name, manufactured by Dupont, a fluorine-based surfactant] | 0.1% |
| Resin particles (resin with the following structure) | |
| Styrene-acrylic resin [Mw 5200, acid value of 62 KOH mg/g] | 0.5% |
| A wax dispersion (SEROZOL 524, trade name, manufactured by Chyukyo Yushi, solid content 30%) (carnauba wax dispersion having wax particles (volume average particle diameter of 70 nm)) | 2% |

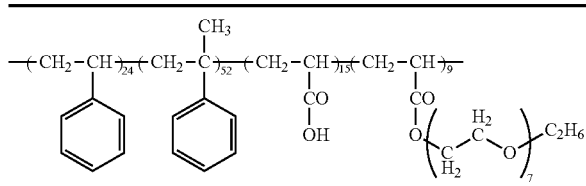

—Ink C0, and Inks C2 to C6—

Inks C2 to C6 were prepared in substantially the same manner as the preparation of the ink C1 except that the amount of SEROZOL 524, which is a wax dispersion, was varied to 0.25%, 0.5%, 3%, 4%, and 5%, and the amount of water was adjusted according to the increase and decrease in the amount of the wax dispersion so that the total of the ink became 100%.

Furthermore, an ink C0 was prepared in substantially the same manner as the preparation of the ink C1 except that SEROZOL 524, a wax dispersion, was not used and the amount of water was 75.4%.

—Ink C7 to Ink C9—

Ink C7, ink C8, and ink C9 were prepared respectively in the same manner as the preparation of the ink C3, ink C1 and ink C4 except the wax dispersion was changed from SEROZOL 524 to TORASORU CN (trade name; solid content 30%) manufactured by Chukyo Yushi.

—Ink C10—

Ink C10 was prepared in substantially the same manner as the preparation of the ink C1 except that the self-dispersing pigment (CAB-O-JET250) was changed to a pigment obtained by dispersing PB 15:3 (manufactured by Dainichiseika Color & Chemicals Mfg. Co., Ltd.) by a polymer (JONCRYL 683, trade name, manufactured by BASF Japan Ltd.) using the following dispersing method.

(Dispersing Method)

400 g of PB 15:3 and 80 g of JONCRYL 683 (acid value 160) (trade name, manufactured by BASF Japan Ltd.) were weighed respectively and mixed with 1560 g of an ion-exchange water, and, furthermore, sodium hydroxide was added in an amount suitable for neutralizing the acid value of the polymer. The obtained mixed liquid was kneaded in a mortar for 1 hour, and then the thus kneaded mixture was coarsely dispersed for 20 minutes using a small stirrer-attached ultrasonic disperser US-600CCVP (600 W, ultrasonic oscillator portion: 50 mm, manufactured by Nippon Seiki Co., Ltd.), whereby a coarse-dispersed liquid was obtained.

Next, the obtained coarse-dispersed liquid and 1.3 kg of 0.05 mm zirconia beads were fed into a SUPER APEX MILL (with a type of SAM-1, trade name, manufactured by Kotobuki Engineering & Manufacturing Co., Ltd.) and dispersed for 160 minutes at a rotating speed of 2500 rpm and a treatment flow rate of 15 L/h. After the completion of dispersing, the resultant substance was filtered with a 32 μm filter fabric, and an appropriate amount of water was added, whereby 10% by mass of a cyan pigment-dispersed liquid was obtained.

Table 1 shows the wax contents (%) of the ink C0 to ink C10. In the wax content (%), the numeric values in the "dispersion" column represent the amount of wax dispersions with respect to the total mass of the ink, and the numeric values in the "solid content" column represent the amount of the solid content of wax dispersions with respect to the total mass of the ink.

<Evaluation of Ink Stability>

Variation in the viscosity of the obtained inks C0 to C10 before and after leaving at 50° C. for 7 days was measured using an E-type viscosimeter (manufactured by Togi Sangyo Co., Ltd.) and evaluated based on the criteria below. The results are shown in Table 1.

—Evaluation Criteria—

A: The viscosity variation is less than 1.0 mPa·s, which is practically non-problematic.

B: The viscosity variation is from 1.0 mPa·s to less than 1.5 mPa·s, which is practically non-problematic.

C: The viscosity variation is 1.5 mPa·s or higher, which is practically problematic in ejection.

TABLE 1

| Ink | Kind of wax | Wax content (%) Dispersion | Wax content (%) Solid content | Stability of ink viscosity over time |
|---|---|---|---|---|
| Ink C0 | | 0 | 0 | A |
| Ink C2 | SEROZOL 524 | 0.25 | 0.25 | A |
| Ink C3 | SEROZOL 524 | 0.5 | 0.5 | A |
| Ink C1 | SEROZOL 524 | 2 | 2 | A |
| Ink C4 | SEROZOL 524 | 3 | 3 | A |
| Ink C5 | SEROZOL 524 | 4 | 4 | A |
| Ink C6 | SEROZOL 524 | 5 | 5 | B |
| Ink C7 | TORASORU CN | 0.5 | 0.5 | B |
| Ink C8 | TORASORU CN | 2 | 2 | B |

TABLE 1-continued

| Ink | Kind of wax | Wax content (%) Dispersion | Wax content (%) Solid content | Stability of ink viscosity over time |
|---|---|---|---|---|
| Ink C9 | TORASORU CN | 3 | 3 | B |
| Ink C10 | SEROZOL 524 | 2 | 2 | C |

<Preparation of the Treatment Liquid>
—Treatment Liquid 1 (Treatment Liquid Containing the Copolymerized Polymers of Epihalohydrin and Dimethylamine)—
Components were mixed and dissolved to produce the composition below, whereby the treatment liquid 1 was prepared.

| Copolymer of epihalohydrin and dimethylamine | |
|---|---|
| FLOQUAT FL-14, trade name, manufactured by SNF Floerger | 2% |
| Solvent | |
| 4-methylmorpholine-N-oxide | 9.5% |
| Trimethylolpropane | 17.0% |
| Surfactant | |
| ZONYL-FSN 100 (fluorine-based surfactant, trade name, manufactured by Dupont) | 0.1% |
| OLFINE E1010 (trade name, manufactured by Nissin Chemical Industry Co., Ltd.) | 0.9% |
| Water | 70.5% |

—Treatment Liquid 2 (Treatment Liquid, Containing a Multivalent Metal)—
Components were mixed and dissolved to produce the composition below, whereby the treatment liquid 2 was prepared.

| Solvent (glycerin) | 10% |
|---|---|
| Multivalent metal (calcium chloride) | 5% |
| Water | 85% |

<Image Forming Method and Evaluation>
Using ink sets constituted by using, among the obtained ink C0 to ink C10, the ink C0 to ink C4 and the ink C7 to ink C9, and the treatment liquids 1 and 2, images were formed according to the following order, and image formation and the obtained images were evaluated. Table 2 shows the constituents of the ink sets and the evaluation results. Here, in the "wax amount" in Table 2, the numeric values in the "dispersion" column represent the amount of wax dispersions with respect to the total mass of the ink, and the numeric values in the "solid content" column represent the amount of the solid content of wax dispersions with respect to the total mass of the ink.

Example 1

A GELJET GX5000 printer head (trade name, manufactured by Ricoh Company Ltd.) was prepared, and a storage tank linked to the printer was refilled with the ink C1, whereby the ink C1 was loaded into the tank.
An (N) SILVER DIA (trade name, manufactured by Nippon Paper Industries Co., Ltd.)) with a basis weight of 104.7 g/m$^2$ was prepared as a recording medium, and the prepared recording medium was fixed on a stage that can move in a predetermined linear direction at 500 mm/second, and the stage was maintained at a temperature of 30° C. Furthermore, the treatment liquid 1 was coated on the recording medium with a bar coater so as to have a thickness of about 1.2 and the recording medium was dried at 50° C. for 2 seconds immediately after the coating.
Then, the GELJET GX5000 printer head was fixed and disposed in a manner that the direction of the line head in which the nozzle was lined up (primary scanning direction) to form an angle of 75.7 degrees with respect to a direction perpendicular to the moving direction of the stage (secondary scanning direction). The ink C1 was ejected in the line mode under the ejection conditions of an ink droplet amount of 2.4 µL, an ejection frequency of 24 kHz, and a resolution of 1200 dpi×1200 dpi, while the recording medium was moved in the secondary scanning direction at a constant speed, whereby a cyan solid image was printed.
Immediately after printing the image, the recording medium was dried with a dryer at 60° C. for 3 seconds. Furthermore, the recording medium was subjected to a fixing treatment at a nip pressure of 0.25 MPa and a nip width of 4 mm by passing the recording medium through a pair of fixing rollers heated up to 60° C., whereby an evaluation sample of Example 1 was obtained.
<Rubbing Resistance Evaluation 1 (Highlighter Pen Rubbing)>
The evaluation sample was left at room temperature for 3 hours after the printing, and, using a commercially available highlighter pen (WKT4-Y, fluorescent OPTEX 2, trade name, manufactured by Zebra Co., Ltd.), writing was made from the image portion to a non-printed portion (white characters), then discoloration of the non-printed portion and contamination at the tip of the highlighter pen was evaluated visually.
—Evaluation Criteria—
A: It is not possible to visually observe discoloration at the non-printed portion and the tip of the highlighter pen.
B: It is possible to visually observe discoloration at the non-printed portion and the tip of the highlighter pen.
<Rubbing Resistance Evaluation 2 (Paper Rubbing)>
A print-free (N) SILVER DIA cut into a size of 10 mm×50 mm was wound on a paperweight (with a mass of 470 g and a size of 15 mm×30 mm×120 mm), and rubbed back and forth three times on a surface on which the image of an evaluation sample was printed. At this time, the contact area between the print-free SILVER DIA and the evaluation sample is 150 mm$^2$, and the load applied to the image of the evaluation sample corresponds to a load of 260 kg/m$^2$. After rubbing, the printed surface of the evaluation sample was visually observed and evaluated according to the evaluation criteria below.
—Evaluation Criteria—
A: It is not possible to visually observe peeling-off of the image (colorant) on the printed surface.
B: It is not possible to visually observe peeling-off of the image (colorant) on the printed surface, but the colorant is transferred to the rubbed paper.
C: It is possible to visually observe slight peeling-off of the image (colorant) on the printed surface, which is practically non-problematic.
D: It is possible to visually observe peeling-off of the image (colorant) clearly on the printed surface, which is practically problematic.
<Evaluation of Ink Droplet Enlargement Suppressing Property (Dot Enlarging)>
The GELJET GX5000 printer head (trade name, manufactured by Ricoh Company Ltd.) was fixed in a manner that the direction of the line head in which the nozzle was lined up (primary scanning direction) was aligned with a direction perpendicular to the moving direction of the stage (secondary scanning direction). Then, a storage tank linked to the GEL-JET GX5000 was refilled with the ink C1, whereby the ink C1 was loaded into the tank.

As a recording medium, a TOPKOTE PLUS with a basis weight of 104.7 g/m² (trade name, manufactured by Oji Paper Co., Ltd.) was prepared, and the prepared recording medium was fixed on a stage that can move in a predetermined linear direction at 500 mm/second, and the stage was maintained at a temperature of 25° C. Furthermore, the treatment liquid 1 was coated on the recording medium with a bar coater so as to have a thickness of about 1.7 and the recording medium was dried at 50° C. for 2 seconds immediately after the coating.

Next, the ink C1 was ejected with an ink droplet amount of 2.4 µL, an ejection frequency of 5 kHz, and a nozzle arrangement direction×transportating direction of 75 dpi×300 dpi, while the stage was moved in the transporting direction (secondary scanning direction) at a speed of 504 mm/second, whereby a dot image was printed.

The printed image was observed using a microscope (DOT ANALYZER DA6000, trade name, manufactured by Oji Scientific Instrument) at a magnification ratio of 50 times and evaluated according to the criteria below. It is considered that, in a case in which the observed dots have a round shape, the ink droplets ejected from the nozzle when forming an image were solidified without combining with adjacent ink droplets and bleeding.

—Evaluation Criteria—
A: Dot enlarging rate is less than 1.90.
B: Dot enlarging rate is from 1.90 to less than 1.95.
C: Dot enlarging rate is from 1.95 to less than 2.00.
D: Dot enlarging rate is 2.00 or more.

Here, the "enlarging rate" of dots refers to a value calculated by "the diameter of a dot printed on the recording medium"/"the diameter of an ink drop with an assumption that the ink drop has a sphere shape when being ejected," and serves as a criterion to judge ink bleeding. It is considered that, if the enlarging rate is 2 or more, ink bleeding is large.

Examples 2 to 7, Comparative examples 1 to 3

Evaluation samples of Examples 2 to 3 and Comparative examples 1 to 3 were manufactured and evaluated in the same manner as the image formation and evaluation of Example 1 except that the ink C1 and the treatment liquid 1 of the ink set were changed into ink sets with the combinations shown in Table 2. Table 2 shows the constitutions and evaluation results of the ink sets of Examples 2 to 7 and Comparative examples 1 to 3.

TABLE 2

| | Ink set constitution | | | | Evaluation | | |
| | | | | | Rubbing resistance | | Ink droplet enlargement suppressing property |
| | | Ink | | | High-lighter | | |
| | Treatment | | Wax amount | | | | |
| | liquid Kind | Kind | Dispersion | Solid content | pen rubbing | Paper rubbing | Dot enlarging |
| Example 1 | Treatment liquid 1 | Ink C1 | 2% | 2% | A | A | A |
| Comparative example 1 | Treatment liquid 1 | Ink C0 | 0% | 0% | A | D | C |
| Comparative example 2 | Treatment liquid 2 | Ink C1 | 2% | 2% | A | B | D |
| Example 2 | Treatment liquid 1 | Ink C2 | 0.25% | 0.25% | A | C | C |
| Example 3 | Treatment liquid 1 | Ink C3 | 0.50% | 0.50% | A | B | C |
| Example 4 | Treatment liquid 1 | Ink C4 | 3% | 3% | A | A | A |
| Example 5 | Treatment liquid 1 | Ink C7 | 0.50% | 0.50% | A | B | C |
| Example 6 | Treatment liquid 1 | Ink C8 | 2% | 2% | A | B | A |
| Example 7 | Treatment liquid 1 | Ink C9 | 3% | 3% | A | A | A |

As is clear from Table 2, the present invention exhibited an excellent rubbing resistance and ink droplet enlargement suppressing property.

According to the present invention, it is possible to provide an image forming method with which enlargement of ink droplet size may be easily suppressed even on a coat paper and images with an excellent rubbing resistance is formed.

In addition, according to the present invention, it is also possible to provide an ink set which is excellent in terms of ink droplet enlargement suppressing property on a coat paper and the rubbing resistance of an image.

Exemplary embodiments of the invention include, but are not limited to, the following.

<1> An image forming method comprising:
applying a treatment liquid containing a copolymer of epihalohydrin and dimethylamine to a recording medium having a coated layer; and
applying an ink composition containing a self-dispersing pigment, a solvent, a surfactant, wax particles and water to the recording medium.

<2> The image forming method according to <1>, wherein a content of the wax particles is from 0.1% by mass to 10% by mass with respect to a total mass of the ink composition.

<3> The image forming method according to <1> or <2>, wherein the wax particles are carnauba wax particles.

<4> The image forming method according to any one of <1> to <3>, wherein a volume average particle diameter of the wax particles is from 50 nm to 100 nm.

<5> The image forming method according to any one of <1> to <4>, wherein the solvent is a polyhydric alcohol.

<6> The image forming method according to any one of <1> to <5>, wherein the ink composition further includes a resin having a weight average molecular weight of from 1,000 to 10,000 and an acid value of from 50 mgKOH/g to 100 mgKOH/g.

<7> The image forming method according to any one of <1> to <6>, wherein a content of the copolymer of epihalohydrin and dimethylamine is from 0.5% by mass to 10% by mass with respect to a total mass of the treatment liquid.

<8> The image forming method according to any one of <1> to <7>, wherein the ink composition is applied to the recording medium by a single pass method.

<9> An ink set comprising:
a treatment liquid containing a copolymer of epihalohydrin and dimethylamine; and
an ink composition containing a self-dispersing pigment, a solvent, a surfactant, wax particles and water.

<10> The ink set according to <9>, wherein a content of the wax particles is from 0.1% by mass to 10% by mass with respect to a total mass of the ink composition.

<11> The ink set according to <9> of <10>, wherein the wax particles are carnauba wax particles.

<12> The ink set according to any one of <9> to <11>, wherein a volume average particle diameter of the wax particles is from 50 nm to 100 nm.

<13> The ink set according to any one of <9> to <12>, wherein the solvent is a polyhydric alcohol.

<14> The ink set according to any one of <9> to <13>, wherein the ink composition further includes a resin having a weight average molecular weight of from 1,000 to 10,000 and an acid value of from 50 mgKOH/g to 100 mgKOH/g.

<15> The ink set according to any one of <9> to <14>, wherein a content of the copolymer of epihalohydrin and dimethylamine is from 0.5% by mass to 5% by mass with respect to a total mass of the treatment liquid.

All publications, patent applications, and technical standards mentioned in this specification are herein incorporated by reference to the same extent as if each individual publication, patent application, or technical standard was specifically and individually indicated to be incorporated by reference.

What is claimed is:

1. An image forming method comprising:
    applying a treatment liquid containing a copolymer of epihalohydrin and dimethylamine to a recording medium having a coated layer; and
    applying an ink composition containing a self-dispersing pigment, a solvent, a surfactant, carnauba wax particles and water to the recording medium, a content of the wax particles being from 2% by mass to 3% by mass with respect to a total mass of the ink composition.

2. The image forming method according to claim 1, wherein a volume average particle diameter of the wax particles is from 50 nm to 100 nm.

3. The image forming method according to claim 1, wherein the solvent is a polyhydric alcohol.

4. The image forming method according to claim 1, wherein the ink composition further includes a resin having a weight average molecular weight of from 1,000 to 10,000 and an acid value of from 50 mgKOH/g to 100 mgKOH/g.

5. The image forming method according to claim 1, wherein a content of the copolymer of epihalohydrin and dimethylamine is from 0.5% by mass to 10% by mass with respect to a total mass of the treatment liquid.

6. The image forming method according to claim 1, wherein the ink composition is applied to the recording medium by a single pass method.

7. An ink set comprising:
    a treatment liquid containing a copolymer of epihalohydrin and dimethylamine; and
    an ink composition containing a self-dispersing pigment, a solvent, a surfactant, carnauba wax particles and water, a content of the wax particles being from 2% by mass to 3% by mass with respect to a total mass of the ink composition.

8. The ink set according to claim 7, wherein a volume average particle diameter of the wax particles is from 50 nm to 100 nm.

9. The ink set according to claim 7, wherein the solvent is a polyhydric alcohol.

10. The ink set according to claim 9, wherein the ink composition further includes a resin having a weight average molecular weight of from 1,000 to 10,000 and an acid value of from 50 mgKOH/g to 100 mgKOH/g.

11. The ink set according to claim 7, wherein a content of the copolymer of epihalohydrin and dimethylamine is from 0.5% by mass to 5% by mass with respect to a total mass of the treatment liquid.

* * * * *